United States Patent [19]

Nicholas et al.

[11] Patent Number: 4,939,025
[45] Date of Patent: Jul. 3, 1990

[54] PAPERMAKER'S FELT WITH FLEX JOINT SEAM FOR PIN

[75] Inventors: Dimitri P. Nicholas, Savannah, Ga.; Pieter S. Diehl, Pleasant Hill, Ohio

[73] Assignee: The Orr Felt Company, Piqua, Ohio

[21] Appl. No.: 305,320

[22] Filed: Feb. 1, 1989

[51] Int. Cl.⁵ .............................................. B32B 3/04
[52] U.S. Cl. ................ 422/223; 139/383 A; 162/DIG. 1; 162/358; 428/222; 428/234; 428/280; 428/300
[58] Field of Search ............... 428/280, 222, 223, 234, 428/300; 162/DIG. 1, 358; 139/383 A

[56] References Cited

U.S. PATENT DOCUMENTS

| | | | |
|---|---|---|---|
| 2,883,734 | 4/1959 | Draper, Jr. | 28/72 |
| 2,893,007 | 7/1959 | Windt | 66/202 |
| 2,907,093 | 10/1959 | Draper, Jr. | 28/72 |
| 3,283,388 | 11/1966 | Kelleher et al. | 28/72 |
| 3,815,645 | 6/1974 | Codorninu | 139/383 A |
| 4,095,622 | 6/1978 | MacBean | 139/383 A |
| 4,123,022 | 10/1978 | Dutt et al. | 139/383 A |
| 4,401,137 | 8/1983 | Cannon | 139/383 A |
| 4,435,457 | 3/1984 | Servo et al. | 428/58 |
| 4,539,730 | 9/1985 | Romanski | 139/383 A |
| 4,574,435 | 3/1986 | Luciano et al. | 139/383 A |
| 4,601,785 | 7/1986 | Lilja et al. | 162/199 |
| 4,698,250 | 10/1987 | Talonen et al. | 428/58 |
| 4,737,241 | 4/1988 | Gulya | 162/199 |
| 4,743,482 | 5/1988 | Johansson et al. | 428/57 |
| 4,755,260 | 7/1988 | Sakuma | 162/99 |
| 4,764,417 | 8/1988 | Gulya | 428/222 |
| 4,775,446 | 10/1988 | Eschmann | 162/358 |
| 4,842,925 | 6/1989 | Dufour et al. | 428/223 |

FOREIGN PATENT DOCUMENTS 57-55358 2/1982 Japan .

Primary Examiner—James J. Bell
Attorney, Agent, or Firm—Biebel, French & Nauman

[57] ABSTRACT

A wet press papermaker's felt which has a base fabric joined at a pin seam, and which has a batting applied to the felt surface so that the felt is relatively stiff and difficult to join at the pin seam, is provided with a region of increased transverse flexibility through the felt to facilitate the bending of one end of the felt during the threading of a pin through the pin seam. In one embodiment, the region of increased transverse flexibility is formed by a second pin seam in which the batting is uncut at the seam. In another embodiment, this region is defined by a common transverse cross-over point in which the top loop-forming strands go through the fabric to the opposite surface, thereby forming a region of transverse flexibility.

5 Claims, 3 Drawing Sheets

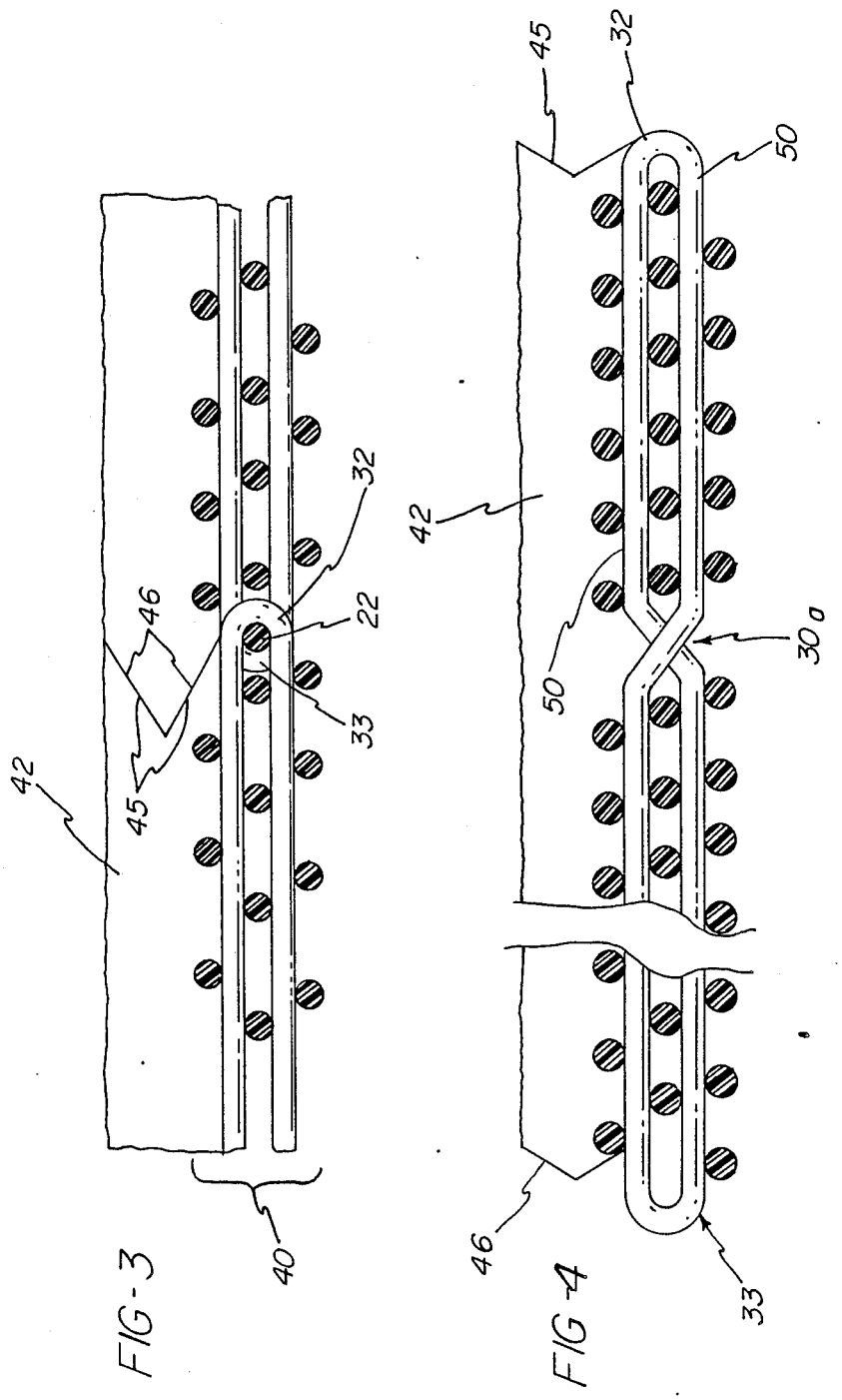

PAPERMAKER'S FELT WITH FLEX JOINT SEAM FOR PIN

BACKGROUND OF THE INVENTION

This invention relates to papermaker's wet press felts and more particularly to such a felt in which the opposite ends are joined by a pin seam.

The prior patent art contains numerous examples on pin-seam type felts for paper making machines, along with discussions of the advantages which can be gained by using pin-seam felt over a more conventional endless felt. These prior patents include the following U.S. and foreign patent documents:

Draper, Jr., 2,883,734 of Apr. 28, 1959
Kelleher, et al, 3,283,388 of Nov. 8, 1966
Codorniu, 3,815,645 of Jun. 11, 1974
Cannon, 4,401,137 of Aug. 30, 1983
Lilja et al, 4,601,785 of Jul. 22, 1986
Talonen et al, 4,698,250 of Oct. 6, 1987
Johansson et al, 4,743,482 of May 10, 1988
Sakuma, 4,755,260 of Jul. 5, 1988
Japanese Pat. No. 57-55358

Typically, the pin seam felt today is formed with a woven base fabric and carries one or more layers of needled batting material on one or both of the face surfaces of the base fabric. An advantage of the pin seam on such a felt s that the felt can be made as stiff as desired, and still get it threaded onto the paper making machine. If the same felt were woven endless, it would be very heavy, stiff, and difficult to install on the machine.

Difficulties are encountered in two general areas. The one of these difficulties resides in the necessity of threading the pin through the cross-machine fabric loops on the opposed ends of the felt. The ends of the felt must be brought together on the machine, and a flexible leader wire is threaded through the internested loops, a short section or length at a time. Then it is used to pull the pin through while pulling the leader out of a gap between loops. This is repeated across the width of the machine, which may exceed 400 inches. The tedious process is often made all the more difficult because of cramped space and poor lighting.

A second difficulty resides in the necessity of cuting through the layer or layers of needled batting at the pin seam joint, since the joint was temporarily joined during felt manufacture and batt needling. Once the batting layer has been severed at the seam, it is very difficult to join it together again on the machine.

SUMMARY OF THE INVENTION

The bringing together of the looped ends of the fabric can be made substantially easier by providing a transverse line of flexibility or hinge means in one or the other of the felt ends adjacent the pin seam. This may be accomplished by including a second uncut pin seam near the cut seam, or by positioning the cross-over of the loop forming strands adjacent the cut pin seam. By either of these means a region or line of relative flexibility is built into the needled felt adjacent the pin seam, to simplify the manipulation of the cut butt ends, to bring the seam loops into pin-receiving alignment.

It is therefore an object of the invention to provide a built-line of flexibility, in a pin seam type of papermaker's felt, in a least one of the butt ends adjacent the pin seam, to facilitate the interfitting of the pin reciving loops.

These and other objects and advantages of the invention will be apparent from the following description, the accompanying drawings, and the appended claims.

BREIF DESCRIPTION OF ACCOMPANYING DRAWINGS

FIG. 3 is a view similar to FIG. 2 showing the interfitted and locked Vee ends and the pin in place, ready to run on the machine; and FIG. 4 is a diagrammatic side view showing a modified form of the invention in which a cross-over forms a transverse region of flexibility.

DESCRIPTION OF PREFERRED EMBODIMENT

Figure 1:
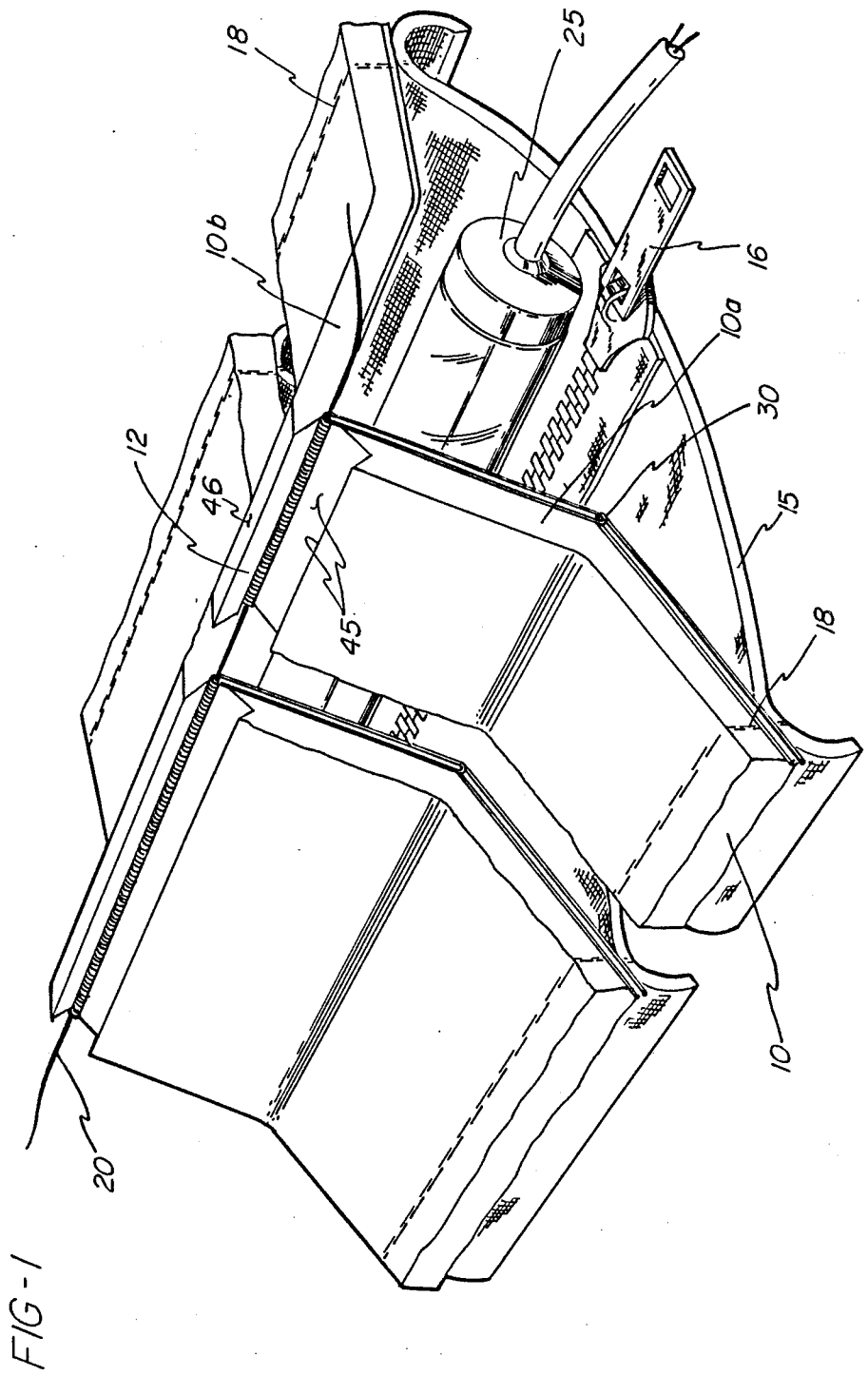
FIG. 1 is a perspective view, partially broken away, showing the assembly of the opposed ends of a pin seam formed in a needled felt of this invention.

Reffering first to FIG. 1, the improved papermaker's felt of the invention is shown at 10 as including a left-hand butt end 10a and a right-hand butt end 10b. The felt 10 is shown in FIG. 1 in the process of being joined at the pin seam 12 on a paper machine. The butt ends are brought and retained in juxtaposition by an arrangement known as a "tent". The "tent" is formed be a transversely positioned canvas support 15 formed in two parts which are joined by a slide fastener 16.

Figure 2:
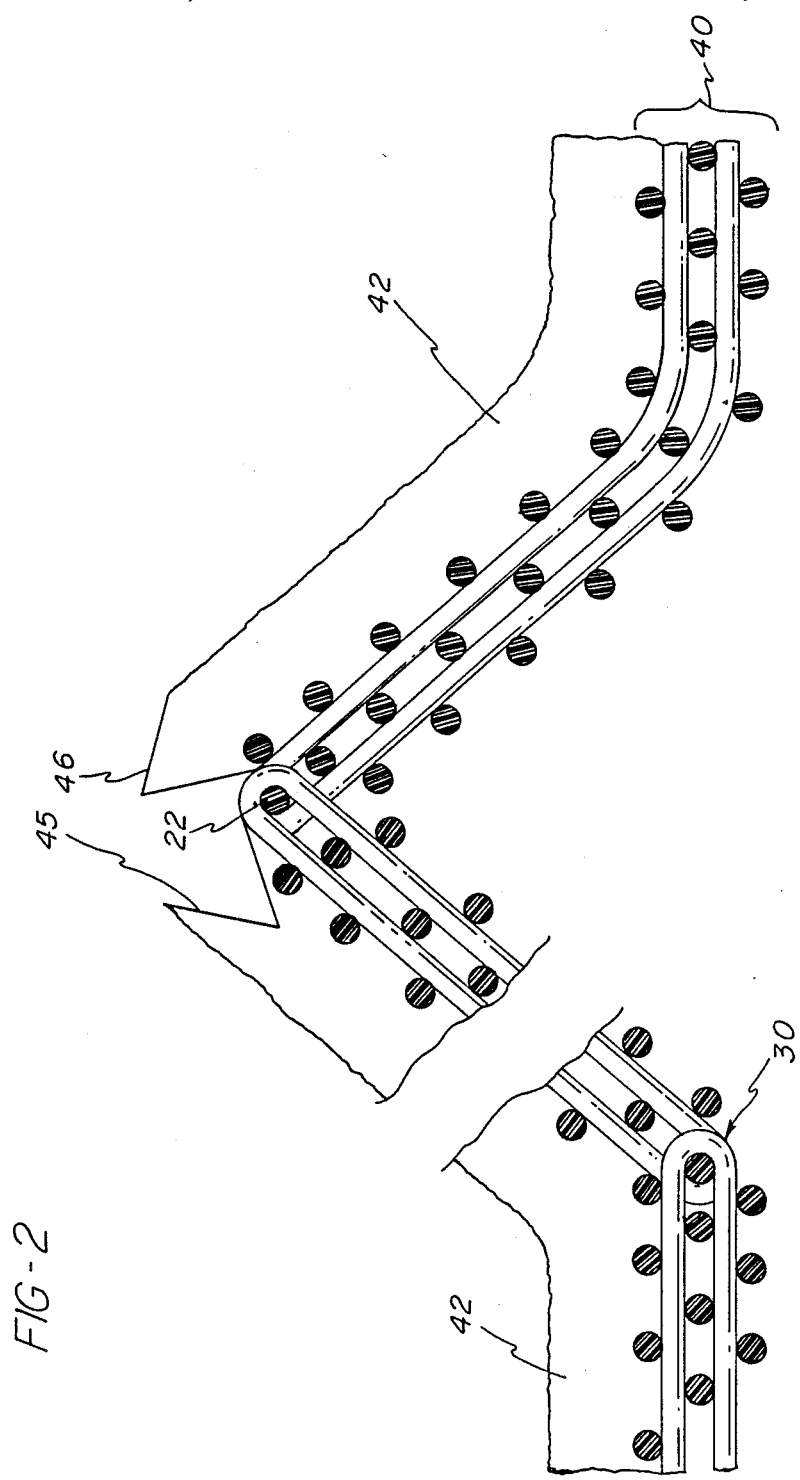
FIG. 2 is a diagrammatic side view of the opposed ends of the felt after the batting layer is cut.

The ends of the canvas support are temporarily joined to each of the butt ends 10a, 10b of the felt, such as by a chain stitch 18, and when the ends are brought together on the machine, they are held by the joining together each of the canvas sections by the slide fastener. The butt ends are then elevated above the canvas 15 in the form of a tent, so that the loops forming the pin seam 12 may be brought together in interfitted alignment to accept the leader wire 20, to pull through the pin 22 (FIG. 2). A fluorescent tube 25 may be inserted into the tent space above the canvas 15 and underneath the seam 12, to illuminate the seam and aid in seeing the loops and the leader wire 20 (FIG. 1).

The alignment of the seam loops may also be materially enhanced by forming the respective end loops 32, 33 (FIG. 3) of colors, as more fully described in the copending application of Nicholas et al, (Docket ORR 015 P2), filed concurrently herewith.

The felt 10 has a woven base fabric structure 40 and a batting layer 42 applied as by needling into the base fabric, as is well known in the art. The batting layer 42 is severed in the region of the seam 12 defined by the loops 32, 33 to form an interlocking means in the form of a transverse Vee groove 45 and a mating protruding Vee 46 in the opposed free end of the batting. The interlocking portions are formed when the batting layer 42 is cut to expose the pin seam, and the previously connected ends are then brought together again as shown in FIG. 3, so that the parts will perfectly mate.

Due to the stiffness of the felt, the interfitting of the loops 32,33 to form the seam can be very difficult, particularly at regions which are remote from the sides of the felt. This is particularly true when attempting to join very wide seams in stiff felts. By providing a flex or hinge portion in the body of hte felt itself, closely adjacent one or both of the butt ends, the felt portion between the hinge and the free end may be much more easily manipulated to bring the loops into registration.

This may be accomplished by forming a second and uncut pin seam at the region 30 of FIG. 1, as shown in FIG. 2. The pin seam 30 is identical to the seam 12, except that the batting layer 42 is uncut. The seam 30 provides a region of transverse flexibility without decreasing the strength of the felt, and greatly enhances the ease of assembly of the loops of the seam 12, since it is only necessary to flex or bend the end portion 10a about the hinge or seam line 30, to bring the loops 32,33 into alignment.

FIG. 4 represents another embodiment of the invention by the provision of a flex hinge at the cross-over-/under region 30a. In the manufacture of the woven base fabric 40 of the felt 10, strands 50 which form the loops 32,33 run partially along an upper surface of the fabric, and then cross over and under at a given longitudinal location and run along the bottom surface of the fabric, in an endless loop. This condition is diagrammatically shown in FIG. 4 at the region 30a, and is normally positioned somewhere midway of the length of the felt. However, the cross-over region 30a may be positioned adjacent one of the opposed felt ends 10a/10b, and provides an inherent transverse hinge-like or flex region of greater flexibility, and may thus by positioned and employed in lieu of the uncut pin seam 30 of FIGS. 1 and 2.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A papermaker's felt having a woven base fabric joined at a transverse pin seam and a batting applied to at least one surface of said bas fabric, in which said felt is relatively stiff and difficult to join at the pin seam, the improvement comprising:

means in said base fabric adjacent said pin seam defining a transverse region of increased transverse flexibility through said felt to facilitate the bending of said felt about said region during the threading of a pin through said pin seam.

2. The felt of claim 1 in which said region consists of a second pin seam, and in which the batting overlying said second pin seam is uncut.

3. The felt of claim 1 in which the pin seam includes a series of interfitted loops and in which the loops are formed by strands which run above and below the base fabric, and in which said loop-forming strands have a common cross-over point leading through the base fabric form one surface thereof to the other, and in which said transverse region of flexibility is defined by said common cross-over point.

4. In a needled type wet press felt for a papermaking machine, in which a woven base fabric has at least one batting needled onto a surface of said fabric, and in which the base fabric is formed with a transverse row of interfitting loops at each of the ends thereof forming a first pin seam for receiving a pin to hold the ends together on a papermaking machine, the improvement comprising means in said base fabric adjacent to one of said ends forming a second pin seam in the form of interfitted loops extending transversely of said fabric and joined by a pin and covered by said batting, said second pin seam forming a region of enhanced flexibility for bending about said second seam to facilitate the installation of said felt on the papermaking machine during the joining of said ends at said first pin seam.

5. In a needled type wet press felt for a papermaking machine, in which a woven base fabric has at least one batting needled onto a surface of said fabric, in which the opposed ends of the base fabric are joined together by a transverse pin seam, and in which said seam includes a series of interfitted loops in which the loops are formed by base fabric strands which extends in the machine direction above and below the base fabric and which strands have a common transverse cross-over region in which the strands on the fabric top exchange position with the strands on the fabric bottom, the improvement comprising the fact that said cross-over region is positioned in said felt adjacent one of said opposed ends forming a region of increased transverse flexibility of said felt to facilitate the installation of said felt a papermaking machine during the joining of said felt ends at said pin seam.

* * * * *

UNITED STATES PATENT AND TRADEMARK OFFICE
CERTIFICATE OF CORRECTION

PATENT NO. : 4,939,025
DATED : July 3, 1990
INVENTOR(S) : Dimitri P. Nicholas, Pieter S. Diehl It is certified that error appears in the above-identified patent and that said Letters Patent is hereby corrected as shown below:

Col. 2, line 47, after "Nicholas et al" insert -- Serial No. 305,347 --.

Col. 3, line 37, "bas" should be -- base --.

Col. 4, line 9, "form" should be -- from --.

Col. 4, line 26, after "said" insert -- felt --.

Col. 4, line 33, "extends" should be -- extend --.

Signed and Sealed this

Twenty-third Day of July, 1991

Attest:

HARRY F. MANBECK, JR.

*Attesting Officer*

Commissioner of Patents and Trademarks